(12) United States Patent  
Pourchet et al.

(10) Patent No.: US 11,894,722 B2  
(45) Date of Patent: Feb. 6, 2024

(54) COIL SUPPORT FOR A ROTARY ELECTRIC MOTOR

(71) Applicant: ETEL S.A., Motiers (CH)

(72) Inventors: Johann Pourchet, La Chaux de Gilley (FR); Loic Moreno, Guyans-Vennes (FR); Manish Mittal, Neuchatel (CH); Jeremie Mallamaci, Gilley (FR); Cyrille Viennet, Oye et Pallet (FR)

(73) Assignee: ETEL S.A., Motiers (CH)

( * ) Notice: Subject to any disclaimer, the term of this patent is extended or adjusted under 35 U.S.C. 154(b) by 243 days.

(21) Appl. No.: 17/478,977

(22) Filed: Sep. 20, 2021

(65) Prior Publication Data

US 2022/0103037 A1 Mar. 31, 2022

(30) Foreign Application Priority Data

Sep. 25, 2020 (EP) .................................... 20198343

(51) Int. Cl.
| | |
|---|---|
| *H02K 1/18* | (2006.01) |
| *H02K 1/14* | (2006.01) |
| *H02K 3/52* | (2006.01) |
| *H02K 3/34* | (2006.01) |
| *H02K 3/46* | (2006.01) |

(52) U.S. Cl.  
CPC ............. *H02K 1/18* (2013.01); *H02K 1/146* (2013.01); *H02K 3/34* (2013.01); *H02K 3/46* (2013.01); *H02K 3/522* (2013.01)

(58) Field of Classification Search  
CPC ........ H02K 3/04; H02K 3/47; H02K 15/0442; H02K 15/045; H02K 15/061; H02K 15/062; H02K 15/066; H02K 15/067  
See application file for complete search history.

(56) References Cited

U.S. PATENT DOCUMENTS

| 3,515,923 A * | 6/1970 | Clizbe .................... H02K 3/345 |
|---|---|---|
| | | 310/215 |
| 9,444,299 B2 | 9/2016 | Mougin et al. |
| 10,505,412 B2 | 12/2019 | Klontz et al. |
| 2013/0106212 A1 * | 5/2013 | Nakazumi ............. H02K 9/223 |
| | | 310/52 |

(Continued)

FOREIGN PATENT DOCUMENTS

| DE | 202009015390 U1 | 2/2010 |
|---|---|---|
| EP | 2717434 B1 | 12/2017 |
| JP | H11122848 A | 4/1999 |

(Continued)

OTHER PUBLICATIONS

Machine translation WO-2020088148-A1 (Year: 2020).*

*Primary Examiner* — Quyen P Leung  
*Assistant Examiner* — Minki Chang  
(74) *Attorney, Agent, or Firm* — LEYDIG, VOIT & MAYER, LTD.

(57) ABSTRACT

A coil support for preformed flat coils of a stator of an electric rotary motor includes an annular supporting structure and a plurality of columns extending upwardly from the supporting structure. The columns are spaced apart from each other to form a corresponding plurality of coil receiving portions configured to hold the preformed flat coils in place before a potting operation. Each of the coil receiving portions is configured to support a lower part of one of the preformed flat coils.

15 Claims, 5 Drawing Sheets

(56) References Cited

U.S. PATENT DOCUMENTS

2019/0207483 A1* 7/2019 De Filippis ............ H02K 9/223
2021/0057954 A1* 2/2021 Brodu ...................... H02K 3/50

FOREIGN PATENT DOCUMENTS

| JP | 2013074728 A | 4/2013 | |
|----|--------------|--------|--|
| WO | WO-2020088148 A1 * | 5/2020 | ............... H02K 1/04 |
| WO | WO 2020088148 A1 | 5/2020 | |

* cited by examiner

COIL SUPPORT FOR A ROTARY ELECTRIC MOTOR

CROSS REFERENCE TO RELATED APPLICATION

This application claims benefit to European Patent Application No. EP 20198343.4, filed on Sep. 25, 2020, which is hereby incorporated by reference herein.

FIELD

The present invention relates to a coil support for a rotary electric motor and to a rotary electric motor comprising such coil support.

BACKGROUND

The performance of electric motors is affected by coil positioning. Accurate positioning of the coils relative to each other and with respect to the coil support is therefore of the utmost importance. Moreover, it is desirable to provide an electrical motor with a reduced footprint with minimal impact on the magnetic performance of the motor. However, regulatory standards require minimum creepage distance along the surface of a solid insulating material between two conductive parts for security reasons which may be difficult to achieve inside a very limited space.

Coils are commonly inserted on the stator teeth using spacers, as disclosed for example in EP2717434, to ensure that they are centered vertically with respect to their corresponding tooth during the assembly process of the electric motor before a potting operation consisting in injecting synthetic resin so as to notably fix together all components of the stator, particularly the coils. The use of such spacers is however time consuming and costly.

SUMMARY

In an embodiment, the present disclosure provides a coil support for preformed flat coils of a stator of an electric rotary motor. The coil support includes an annular supporting structure and a plurality of columns extending upwardly from the supporting structure. The columns are spaced apart from each other to form a corresponding plurality of coil receiving portions configured to hold the preformed flat coils in place before a potting operation. Each of the coil receiving portions is configured to support a lower part of one of the preformed flat coils

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
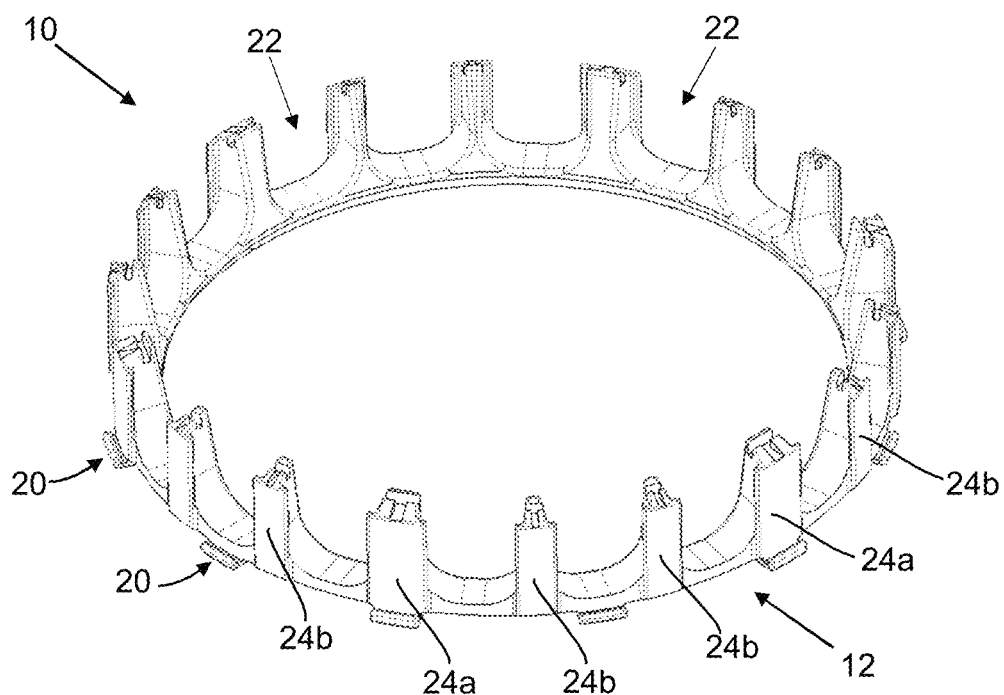
FIG. 1 shows a top perspective view of the coil support according to an embodiment of the invention.

In an embodiment, the present invention provides a coil support that is easy to manufacture and that integrates several functions thereby reducing the overall cost of the rotary electric motor.

In the same or another embodiment, the present invention provides a coil support that increases the ratio between the magnetic performance of the motor and its footprint.

In the same or another embodiment, the present invention provides a coil support on which coils may be easily positioned and glued on the support before a potting operation.

In an embodiment, the present invention provides a coil support 1) that is easy to manufacture and that integrates several functions thereby reducing the overall cost of the rotary electric motor; 2) that increases the ratio between the magnetic performance of the motor and its footprint; and 3) on which coils may be easily positioned and glued on the support before a potting operation. This is achieved by a coil support for preformed flat coils of a stator of an electric rotary motor. The coil support comprises an annular supporting structure, and a plurality of columns extending upwardly from the supporting structure and spaced apart from each other to form a corresponding plurality of coil receiving portions for holding the preformed flat coils in place before a potting operation. Each of the coil receiving portions is configured to support a lower part of a preformed flat coil.

In an embodiment, the lower part of the preformed flat coil corresponds approximately to half of its total height.

In an embodiment, the plurality of columns comprises a first and a second group of columns. The minimal width of the columns of the first group is greater than the minimal width of the columns of the second group. One or more adjacent columns of the second group are arranged in-between two columns of the first group.

In an embodiment, the coil support is adapted for a three-phase rotary motor. This this respect, the minimal width of the columns of the first group is at least 3 mm to ensure a minimum clearance of 3 mm between adjacent coils to be wired to different phases of the motor. The minimal width of the columns of the second group is less than 1.5 mm, preferably less than 1 mm to reduce the distance between adjacent coils to be wired to the same phase of the motor.

In an embodiment, the upper portion of each column comprises a groove of a predefined shape. The predefined shape is preferably a T-shape groove comprising a first groove portion extending between two coils when the coils are mounted on the coil support and a second groove portion extending radially and outwardly from the first groove portion.

In an embodiment, the bottom side of the annular supporting structure comprises a middle ring-shaped flat surface. Several studs protrude from the middle ring-shaped flat surface.

In an embodiment, the bottom side of the annular supporting structure further comprises outer and inner inclined ring-shaped surfaces adjacent to respective side of the middle ring-shaped flat surface.

In an embodiment, the coil support further comprises a first and second plurality of insulating sheet supports extending radially and outwardly from the annular supporting structure. The first plurality of insulating sheet supports extends further in the radial direction than the second plurality of insulating sheet supports. Each of the insulating sheet supports of the first plurality is located between two insulating sheet supports of the second plurality such that a cylindrical insulating sheet has a corrugated shape when mounted on the first and second plurality of insulating sheet supports.

In an embodiment, each column comprises lateral sides and shoulders extending substantially perpendicularly to rear portions of the lateral sides of each column.

Another embodiment of the present invention relates to a coil assembly comprising the coil support according to an embodiment of the present invention and a plurality of preformed flat coils in their receptive coil receiving portion with a rear portion of each preformed flat coil resting against a shoulder of two adjacent columns. The coils are glued in place using a drop of liquid instant adhesive placed in the groove on the upper portion of each column.

Another embodiment of the present invention relates to a stator for a rotary electric motor comprising a stator housing having a cylindrical inner wall, the coil assembly, according to an embodiment of the present invention, mounted inside the cylindrical inner wall and a corrugated insulating sheet mounted between the inner wall of the stator housing and the coil assembly.

A further embodiment of the invention relates to a rotary electric motor comprising the stator according to an embodiment of the present invention. With reference to FIG. 1, the coil support 10 is adapted for a three-phase rotary motor. In this respect, the coil support 10 comprises an annular supporting structure 12 and a plurality of columns 24a, 24b extending upwardly from the supporting structure 12 and spaced apart from each other. As particularly shown in FIG. 3, the width d1, d2 of each column 24a, 24b varies along its upward direction to form a corresponding plurality of coil receiving portions 22 having a substantially U-shaped receiving portion. Each column 24a, 24b comprises lateral sides 28 and rear sides extending substantially perpendicularly to the lateral sides 28 to form shoulders 30. The specific configuration of these columns allows to adjust precisely the coils 40 on the coils support 10 by pushing a rear side of the coils against the shoulder 30 of the columns 24a, 24b as can be seen for example in FIGS. 4 and 5.

The coils 40 are of the type of preformed flat coils which may easily be produced, thereby reducing their production cost in contrast to preformed curved coils which require an additional bending step which has the drawback of sometimes damaging the wire insulation and producing scraps, thereby leading to a higher production cost. The preformed flat coils 40 are positioned into their respective U-shaped receiving portion from the top of the coil support 10 which is designed to support and precisely position the lower part of the preformed flat coils corresponding approximately to half of the total height of the coils.

Figure 3:
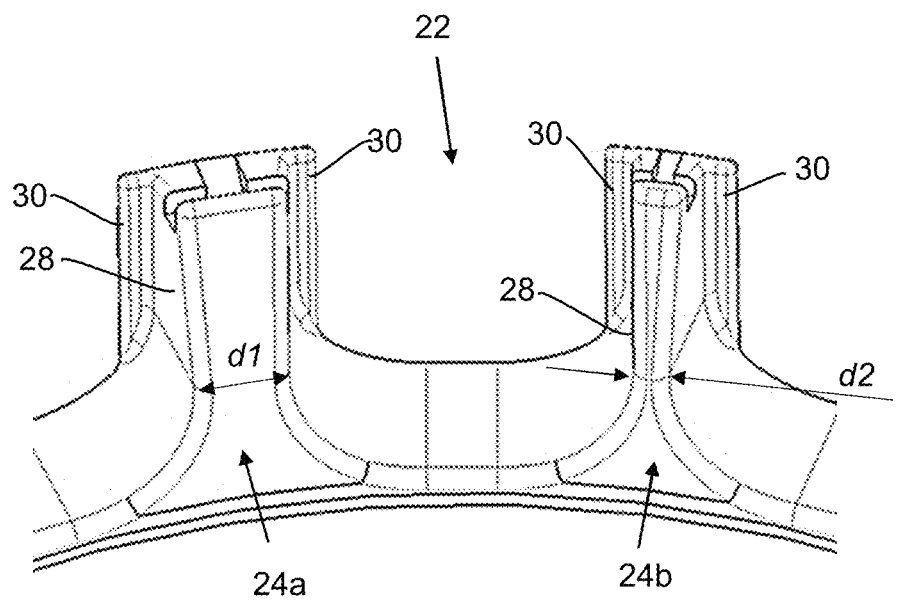
FIG. 3 shows a partial perspective view of the coil support of FIG. 1 showing a coil receiving portion.

The plurality of columns 24a, 24b of the coil support 10 is divided into a first group of columns 24a of the same shape and a second group of columns 24b of the same shape which differs from the shape of the first group of columns 24a. More specifically, the minimal width d1 of the columns 24a of the first group is greater than the minimal width d2 of the columns 24b of the second group as shown in FIG. 3.

According to this exemplary embodiment of the coil support 10, the first group of columns comprises six columns 24a and the second group of columns comprises twelves columns 24b. Two adjacent columns 24b of the second group are mounted between each pair of two columns 24a of the six column 24a of first group. The number of columns of the first and second groups may vary according to the size and the number of preformed flat coils of the electrical motor which need to be supported and accurately positioned. The coil support 10 has been designed to have an optimal ratio between the magnetic performance of the motor and the footprint of the motor.

Figure 4:
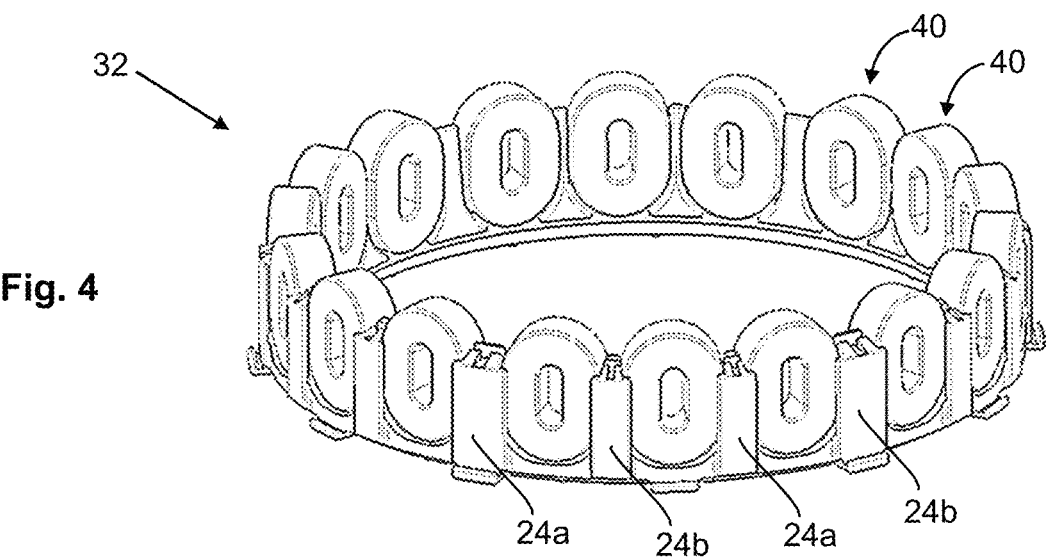
FIG. 4 shows a perspective view of the coil support of FIG. 1 with preformed flat coils mounted thereon.
Figure 7:
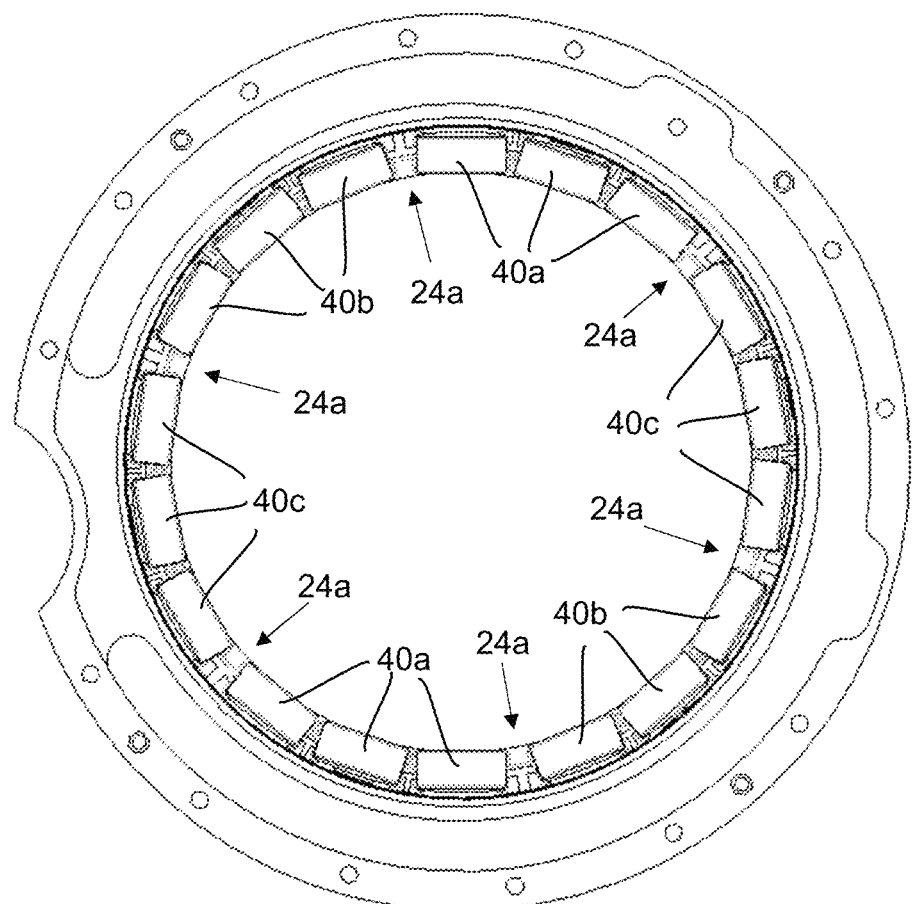
FIG. 7 is a top view of FIG. 6.

As shown in FIG. 4, a corresponding plurality of preformed flat coils 40 are positioned in respective coil receiving portions 22 of the coil support 10 to provide a compact coil assembly 32. The preformed flat coils are mounted to be grouped according to their phase connection. More particularly, with reference to FIG. 7, a first pair of groups comprising three adjacent first-phase coils 40a are mounted in coil receiving portions 22 of the coil support 10 (FIG. 1) in diametrically opposed fashion, a second pair of groups comprising three adjacent second-phase coils 40b are mounted in coil receiving portions of the coil support next to the first pair of groups of first-phase coils 40a, and a third pair of groups comprising three adjacent third-phase coils 40c are mounted in coil receiving portions of the coil support next to the second pair of groups of second-phase coils 40b.

Each pair of groups of adjacent first-phase coils 40a, second-phase coils 40b and third-phase coils 40a respectively are configured to be wired together and electrically connected to each of the phases of the three-phase rotary motor. The voltage of adjacent coils of the same phase is similar and the coils can therefore be placed close to each other in order to maximize the copper filling factor thus maximizing the magnetic performance of the electric motor.

With reference to FIG. 3, the minimal width d2 of the columns 24b of the second group may therefore be less than 1.5 mm, preferably less than 1 mm to reduce the distance between adjacent coils to be wired to the same phase of the electric motor. For adjacent coils of different phases, regulatory safety standards require a minimum creepage distance of 3 mm to avoid leakage current which may result in a break-down of the electric motor. The minimal width d1 of the column 24a is thus around 3 mm. The columns 24a, 24b have therefore been designed to optimize the ratio between the performance of the motor and its footprint while complying with the regulatory safety standards.

Figure 9:
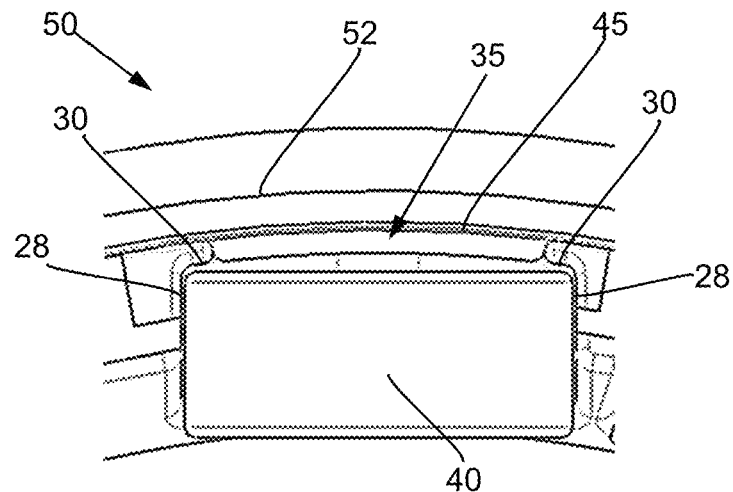
FIG. 9 is a detailed view of FIG. 8 showing a preformed coil mounted inside a coil receiving portion of the coil support.

Referring to FIG. 9, when the coils are mounted on the coil support 10 and the coil support 10 is mounted inside the stator housing 50, with an insulating sheet 45 arranged between the inner wall 52 of the stator housing 50 and the coil support 10, an electrical connection space 35 is created between an inner side 52 of the insulating sheet 45 and the rear of the corresponding coil for the input wire of the corresponding coil.

Figure 8:
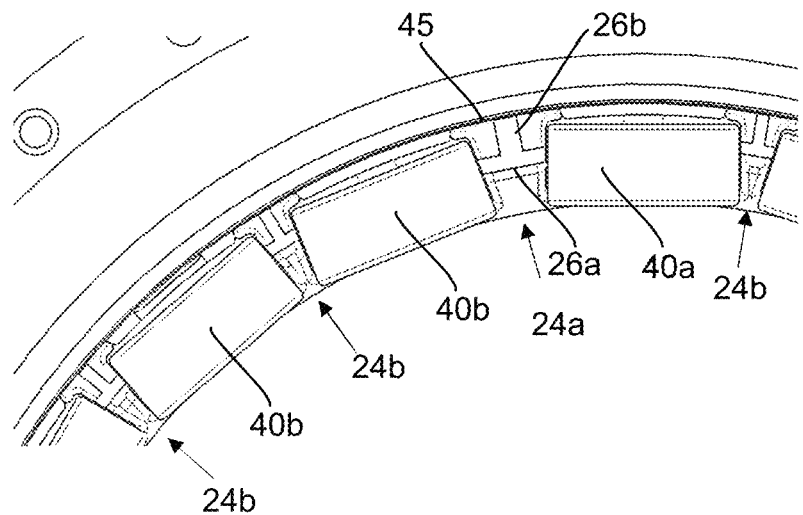
FIG. 8 is a partial top view of FIG. 7.

Referring to FIGS. 8 et 11, the upper portion of each column 24a, 24b comprises a predefined groove such as a substantially T-shaped groove 26 having a first groove portion 26a which leads into both adjacent coil receiving portions 22 and a second groove portion 26b extending radially and outwardly from the first groove portion 26a. The T-shaped groove 26 of each column 24a, 24b is designed to receive liquid instant adhesive and guide such adhesive:

to flow into the interstice between one lateral side of each adjacent coil and both laterals side 28 of respective column to fix the coils to the coil support 10, and to come into contact with the insulating sheet 45 to fix the latter to the coil assembly 32 comprising the coils and the coil support.

The operator glues one coil at a time in their respective U-shaped receiving portion 22 by depositing a drop of liquid instant adhesive in the grooves 26 of the upper portion of the corresponding columns 24a, 24b, while maintaining the coil pressed on the shoulders 30 of two adjacent columns forming the U-shaped receiving portion.

Figure 2:
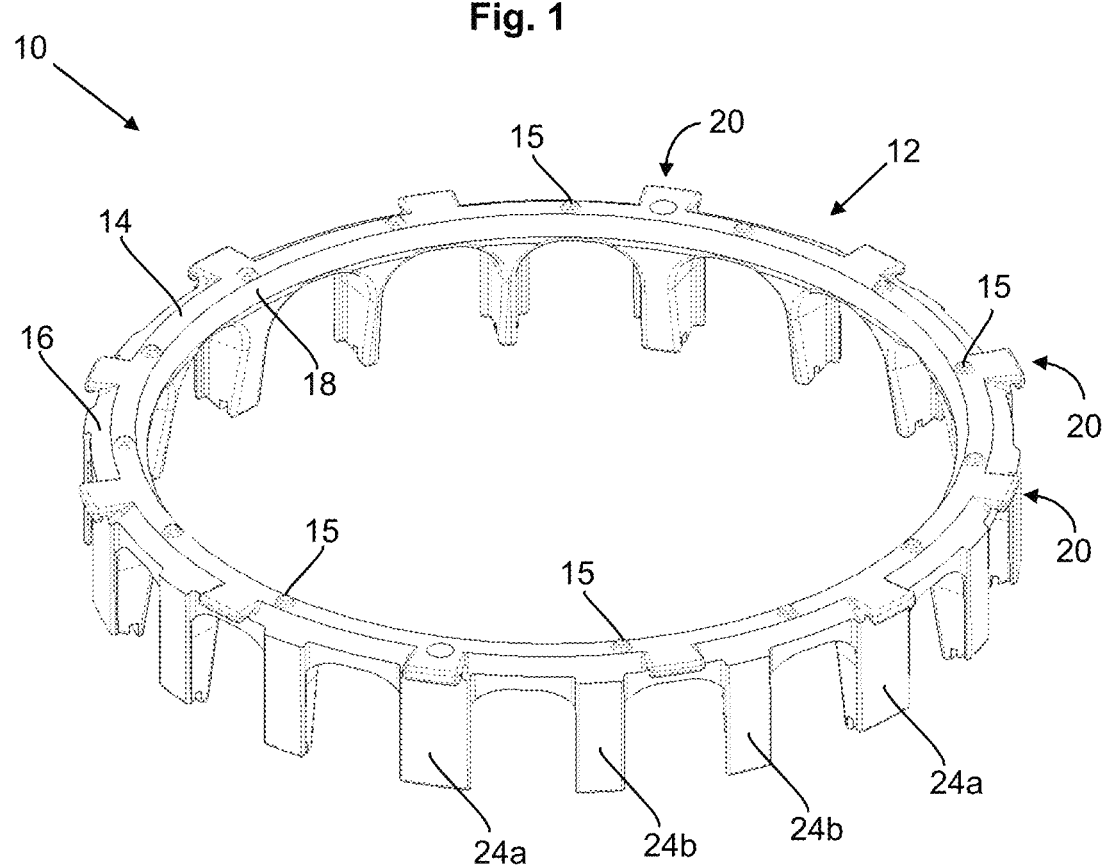
FIG. 2 shows a bottom perspective view of the coil support of FIG. 1.

With reference to FIG. 2, the bottom side of the annular supporting structure 12 comprises a middle ring-shaped flat surface 14, and several studs 15 protruding from the middle ring-shaped flat surface 14. The bottom side of the annular supporting structure 12 further comprises outer and inner inclined ring-shaped surfaces 16, 18 adjacent the middle ring-shaped flat surface 14. The studs 15 are configured to rest on a bottom surface of the stator housing 50. This creates a gap between the bottom side of the coil support 10 and the bottom surface of the stator housing in order to ensure that the synthetic resin fills this gap during the potting operation. The inclined ring-shaped surfaces 16, 18 of the coil support 10 prevent the formation of air bubbles during the potting operation.

Figure 5:
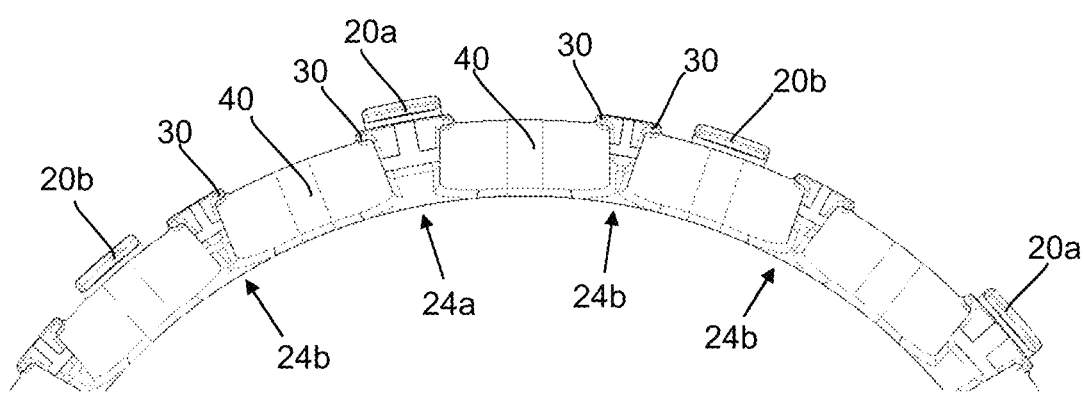
FIG. 5 shows a partial top view of FIG. 4.
Figure 6:
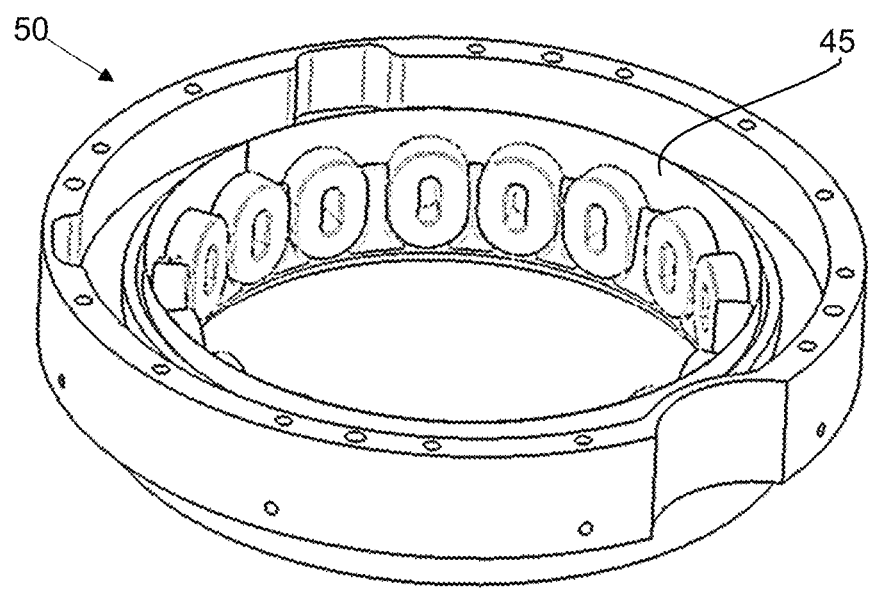
FIG. 6 shows a perspective view of a stator of a rotary electric motor comprising the coil support of FIG. 1 with preformed flat coils mounted thereon.

Referring to FIGS. 2 and 5, the coil support 10 further comprises a first and second plurality of insulating sheet supports 20a, 20b extending radially and outwardly from the annular supporting structure 12. The first plurality of insulating sheet supports 20a extend further in the radial direction than the second plurality of insulating sheet supports 20b. Each of the insulating sheet supports 20a of the first plurality is located between two insulating sheet supports 20b of the second plurality. The distal end of each insulating sheet support comprises an upwardly extending portion 20c (FIG. 10) to form a groove. The insulating sheet 45 is inserted into each groove to induce a corrugated or wavy circular shape of the insulating sheet 45, thereby creating a space with the inner wall 52 of the stator housing 50 to allow the release of air bubbles which may form during the potting operation to obtain an optimal insulation.

Figure 11:
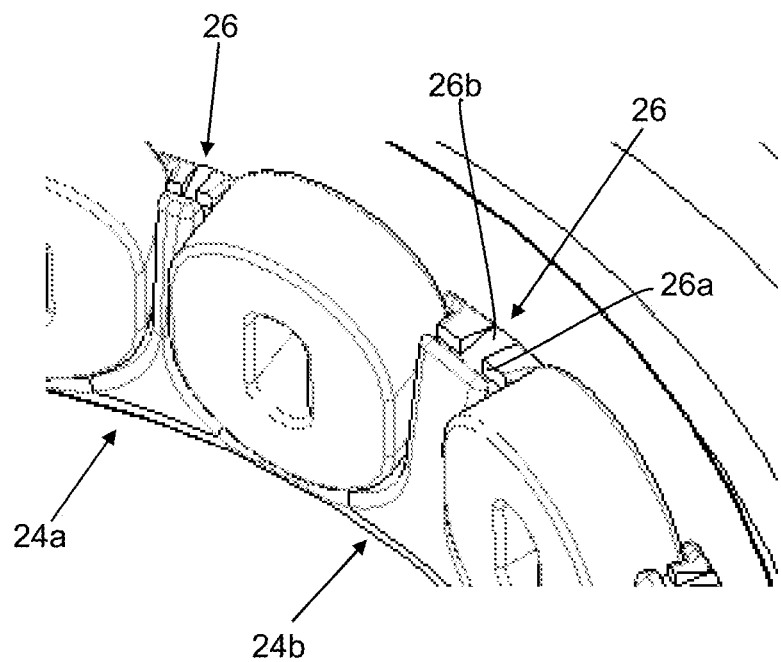
FIG. 11 is a partial perspective view of FIG. 6.

The insulating sheet 45 is mounted on the coil support 10, as described above, prior the gluing operation such that when the operator fills successively the T-shaped groove 26 of each columns 24a, 24b of the coil support 10 with liquid instant adhesive, the latter runs along the second groove portion 26b (FIG. 11) to come into contact with the insulating sheet 45 to fix the insulating sheet to the coils support.

Figure 10:
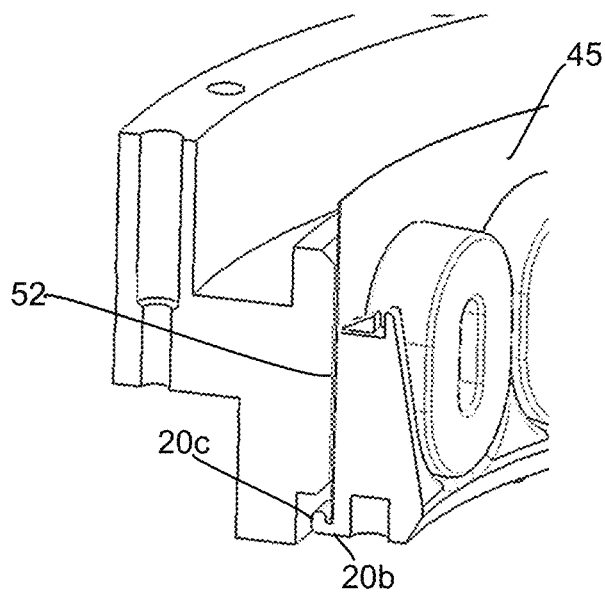
FIG. 10 is a perspective cross-sectional view of FIG. 6.

Referring to FIGS. 5 and 10, the insulating sheet supports 20b prevent the lower edge of the insulating sheet 45 to come into contact of bottom surface of the stator housing 50. The synthetic resin may thus flow into all the gaps of the stator during the potting operation, thereby ensuring an insulation between all conductive parts of the stator.

The electrical connection space 35 can advantageously be used for the wire output from the middle of the coil, and for making the connections between the coils prior to the potting operation.

The coil support is advantageously produced by an additive manufacturing process, which reduces the overall production cost of the electric motor. In that respect, the lateral sides 28 of each columns 24a, 24b are slanted outwardly, the inner diameter increasing progressively upwardly. This specific shape ensures that the minimum width of the columns is not less than 1 mm to be compatible with additive manufacturing.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Coil support 10
Annular supporting structure 12
Middle ring-shaped flat surface 14
Studs 15
Outer inclined ring-shaped surface 16
Inner ring-shaped surface 18
Insulating sheet support 20
First radial extending portions 20a
Upwardly bending portion 20c
Grooves
Second radial extending portion 20b
Upwardly extending portion 20c
Grooves
Coil receiving portion 22
U-shaped portion
Columns
First group of columns 24a
Second group of columns 24b
Upper portion
T-shaped groove 26
First groove portion 26a
Second groove portion 26b
Lateral sides 28
Shoulder 30
Coil assembly 32
Electrical connection space 35
preformed flat coils 40
First, second and third phase coils 40a, 40b, 40c Insulating sheet 45
Stator
Stator housing 50
Inner wall 52

What is claimed is:

1. A coil support for preformed flat coils of a stator of an electric rotary motor, the coil support comprising:
   an annular supporting structure; and
   a plurality of columns extending upwardly from the supporting structure and being spaced apart from each other to form a corresponding plurality of coil receiving portions configured to hold the preformed flat coils in place before a potting operation,
   wherein each of the coil receiving portions is configured to support a lower part of one of the preformed flat coils, and
   wherein the plurality of columns comprise a first and a second group of columns, a minimum width of the columns of the first group being greater than a minimum width of the columns of the second group, and wherein one or more adjacent columns of the second group are arranged in-between two columns of the first group.

2. The coil support according to claim 1, wherein the lower part corresponds approximately to half of a total height of the preformed flat coil.

3. The coil support according to claim 1, being adapted for a three-phase rotary motor, wherein a minimum width of the columns of the first group is at least 3 mm to ensure a minimum clearance of 3 mm between adjacent coils to be wired to different phases of the three-phase rotary motor, and wherein a minimum width of the columns of the second group is less than 1.5 mm to reduce the distance between adjacent coils to be wired to the same phase of the three-phase rotary motor.

4. The coil support according to claim 3, wherein the minimum width of the columns of the second group is less than 1 mm.

5. The coil support according to claim 1, wherein an upper portion of each of the columns comprises a groove of a predefined shape comprising a first groove portion extending between two of the coils in a mounted state of the coils in which the coils are mounted on the coil support, and a second groove portion extending radially and outwardly from the first groove portion.

6. The coil support according to claim 5, wherein the grooves are T-shaped.

7. The coil support according to claim 1, wherein a bottom side of the annular supporting structure comprises a middle ring-shaped flat surface, and wherein a plurality of studs protrude from the middle ring-shaped flat surface.

8. The coil support according to claim 1, wherein a bottom side of the annular supporting structure comprises outer and inner inclined ring-shaped surfaces adjacent to a respective side of the middle ring-shaped flat surface.

9. The coil support according to claim 1, further comprising a first and second plurality of insulating sheet supports extending radially and outwardly from the annular supporting structure, wherein the first plurality of insulating sheet supports extend further in the radial direction than the second plurality of insulating sheet supports, and wherein each of the insulating sheet supports of the first plurality of insulating sheet supports is located between two insulating sheet supports of the second plurality of insulating sheet supports such that a circulate insulating sheet has a corrugated shape in a mounted state on the first and second plurality of insulating sheet supports.

10. The coil support according to claim 1, wherein each of the columns comprises lateral sides and shoulders extending substantially perpendicularly to rear portions of the lateral sides.

11. A coil assembly comprising the coil support according to claim 10 and the preformed flat coils each in a respective one of the coil receiving portions with a rear portion of each of the preformed flat coils resting against a respective one of the shoulders of two adjacent ones of the columns.

12. The stator for the rotary electric motor comprising a stator housing having a cylindrical inner wall, the coil assembly according to claim 11 mounted inside the cylindrical inner wall, and a corrugated insulating sheet mounted between the inner wall and the coil assembly.

13. The rotary electric motor comprising the stator according to claim 12.

14. A coil support for preformed flat coils of a stator of an electric rotary motor, the coil support comprising:
    an annular supporting structure; and
    a plurality of columns extending upwardly from the supporting structure and being spaced apart from each other to form a corresponding plurality of coil receiving portions configured to hold the preformed flat coils in place before a potting operation,
    wherein each of the coil receiving portions is configured to support a lower part of one of the preformed flat coils, and
    wherein an upper portion of each of the columns comprises a groove of a predefined shape comprising a first groove portion extending between two of the coils in a mounted state of the coils in which the coils are mounted on the coil support, and a second groove portion extending radially and outwardly from the first groove portion.

15. A coil support for preformed flat coils of a stator of an electric rotary motor, the coil support comprising:
    an annular supporting structure; and
    a plurality of columns extending upwardly from the supporting structure and being spaced apart from each other to form a corresponding plurality of coil receiving portions configured to hold the preformed flat coils in place before a potting operation,
    wherein each of the coil receiving portions is configured to support a lower part of one of the preformed flat coils, and
    wherein the coil support further comprises a first and second plurality of insulating sheet supports extending radially and outwardly from the annular supporting structure, wherein the first plurality of insulating sheet supports extend further in the radial direction than the second plurality of insulating sheet supports, and wherein each of the insulating sheet supports of the first plurality of insulating sheet supports is located between two insulating sheet supports of the second plurality of insulating sheet supports such that a circulate insulating sheet has a corrugated shape in a mounted state on the first and second plurality of insulating sheet supports.

* * * * *